J. TOMLINSON.

Steam Coiled Hoop.

No. 1,551. Reissued Oct. 6, 1863.

Witnesses:
Charles Smith
T. Scheitlin

Inventor.
James Tomlinson.

N. PETERS, Photo-Lithographer, Washington, D. C.

UNITED STATES PATENT OFFICE.

JAMES TOMLINSON, OF WELLINGTON SQUARE, CANADA, ASSIGNOR TO HIMSELF AND ANDREW GAGE, OF SAME PLACE.

STEAM-COILED HOOP.

Specification forming part of Letters Patent No. 38,717, dated May 26, 1863; Reissue No. 1,551, dated October 6, 1863.

*To all whom it may concern:*

Be it known that I, JAMES TOMLINSON, formerly of the township of Pickering, in the county of Ontario and Province of Canada, and now of Wellington Square, in the county of Halton and Province aforesaid, have invented a certain Improvement in Coiled Hoops for Coopers' Use; and I do hereby declare the following to be a full and exact description of the same, reference being had to the accompanying drawings, making part of this specification, in which—

Figure 1:
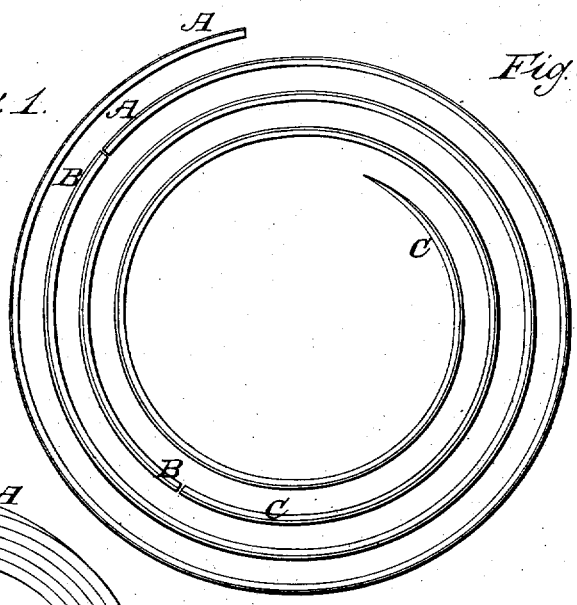
Figure 5:
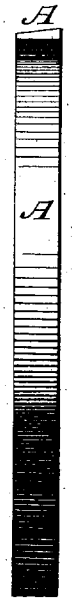
Figure 4:
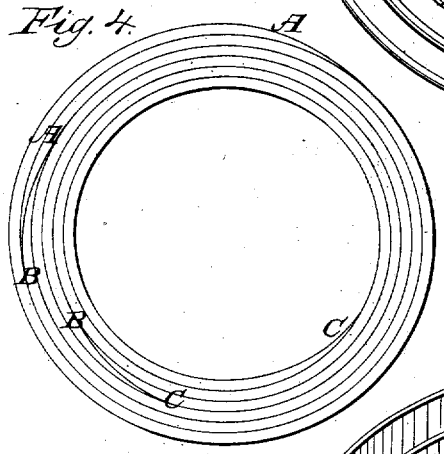
Figure 2:
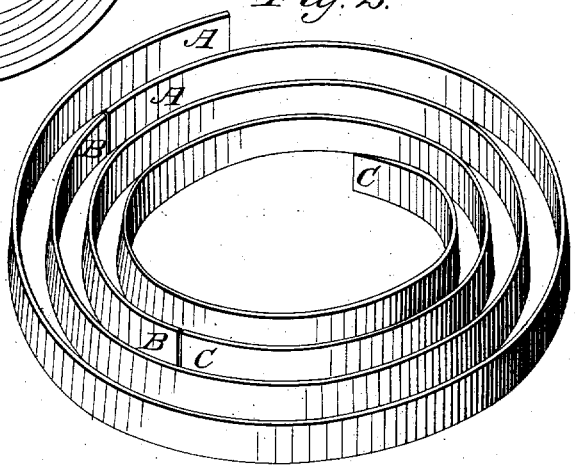

Figure 1 is a perspective view of a number of my improved hoops coiled together. Fig. 2 is a plan of the same. Fig. 3 is a side view of the coil, exhibiting the beveled form of the section or end of the splint. Fig. 4 is a plan on a smaller scale, illustrating the manner of packing "lapped" hoops for transportation.

Similar letters of reference indicate corresponding parts in the several views.

It has been common to use for various kinds of coopers' work hoops of wood, which admit of being split to the necessary dimensions and afterward bent to the required form. This involved the use of very young wood or of particular varieties of timber which have been found to possess the requisite splitting and bending properties, and owing to the comparative scarcity of such timber the demand for material for wooden hoops has hitherto been so far in excess of the supply as to completely exhaust many localities and necessitates a constant recourse to new and distant fields.

The object of my invention is to produce hoops ready for the coopers' use of any kind of timber possessing the requisite strength, and this I accomplish by first sawing or cutting the timber to the needful dimensions and afterward coiling the splints by machinery or by hand, either with or without the assistance of steaming.

In order that others skilled in the art to which my invention appertains may be enabled to fully understand and use the same, I will proceed to describe one manner of carrying it into effect.

The timber may first be sawed, in customary manner, in planks of the thickness required for the width of the hoops, and splints sawed therefrom in beveled form and of the needful thickness to form the hoops. The ends of the splints may then, if desired, be lapped or tapered in the usual way, or for some purposes this may be dispensed with. The hoop-splints are then successively coiled around a mandrel, either with their ends abutting, as shown in Figs. 1 and 2, or lapped, as shown in Fig. 4, by which means they are prepared ready for the cooper's hand, and are also adapted for transportation with the greatest facility, ten or any desired number of the splints being included in each coil, and ten or other convenient number of such coils placed one on another and connected by any suitable means. The coiling may be effected either by machinery or by hand, and either with or without the aid of steaming or boiling. A A, B B, and C C may represent the several hoops or splints.

The great advantage of this invention consists in the facility with which such coiled hoop-splints can be formed into any sized hoop which the workman may require within the extreme dimensions of the splint.

All that is required in using my improved hoop-splint is to "lock" or notch the ends in customary manner to adapted it for immediate application to the vessel which it is designed to encircle.

The above-described hoop-splints are equally applicable to the largest and the smallest kinds of cooper's work. For small work the splint may be coiled continuously in length suitable for a number of hoops and afterward separated as required.

Having thus described my invention and a way of carrying it into effect, I wish it distinctly understood that I do not limit myself to any specific length or dimensions of splint, nor to any form of the same in its transverse section; neither do I restrict myself to any particular means of coiling the same.

What I claim as new and of my invention, and desire to have secured by Letters Patent, is—

A sawed or cut hoop or hoop-splint prepared in coiled form for coopers' use in any manner, substantially as set forth.

JAMES TOMLINSON.

Witnesses:
CHARLES SMITH,
OCTAVIUS KNIGHT.